(12) United States Patent
Miwa et al.

(10) Patent No.: US 6,437,028 B1
(45) Date of Patent: Aug. 20, 2002

(54) CROSSLINKABLE ELASTIC COPOLYMER COMPOSITION

(75) Inventors: Tetsuya Miwa; Takeo Kaneko; Masayuki Saito; Junichi Nakamura, all of Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 09/673,669

(22) PCT Filed: Jun. 16, 1999

(86) PCT No.: PCT/JP99/03213

§ 371 (c)(1),
(2), (4) Date: Nov. 7, 2000

(87) PCT Pub. No.: WO99/65984

PCT Pub. Date: Dec. 23, 1999

(30) Foreign Application Priority Data

Jun. 16, 1998 (JP) .......................... 10-168896
Jun. 30, 1998 (JP) .......................... 10-185006
Mar. 30, 1999 (JP) .......................... 11-089751

(51) Int. Cl.[7] ................................ C08K 5/48
(52) U.S. Cl. ................... 524/92; 524/236; 524/430
(58) Field of Search .................... 524/92, 236, 430

(56) References Cited

FOREIGN PATENT DOCUMENTS

| JP | 06-306238 | 11/1994 |
|----|-----------|---------|
| JP | 08-295776 | 11/1996 |

*Primary Examiner*—Edward J. Cain
(74) *Attorney, Agent, or Firm*—Oblon, Spivak, McClelland, Maier & Neustadt, P.C.

(57) ABSTRACT

An elastic copolymer composition which contains a copolymer having a content of polymer units based on vinylidene fluoride as low as from 0.5 to 15 mol %, which is satisfactory in polyol vulcanizability and which gives a vulcanizate excellent in heat resistance and oil resistance. This composition comprises a tetrafluoroethylene (35 to 65 mol %)/propylene (20 to 50 mol %)/vinylidene fluoride (0.5 to 15 mol %) copolymer, an organic quaternary ammonium hydroxide or a salt of an organic quaternary phosphonium compound with a nitrogen-containing heterocyclic compound, an organic polyhydroxy compound, and a metal oxide or a metal hydroxide, and optionally contains an amine compound.

12 Claims, No Drawings

CROSSLINKABLE ELASTIC COPOLYMER COMPOSITION

TECHNICAL FIELD

The present invention relates to a crosslinkable elastic copolymer composition whereby polyol vulcanizability is excellent, and a vulcanizate excellent in heat resistance and oil resistance can be obtained.

BACKGROUND ART

It is known that an elastic copolymer having vinylidene fluoride (hereinafter referred to as VdF) copolymerized, exhibits an excellent mold release property and gives a vulcanizate having excellent heat resistance, oil resistance and compression set, when an organic polyhydroxy compound is used as a vulcanizing agent. Such a vulcanizate of an elastic copolymer is suitably used as an automobile part such as an oil seal. However, along with the trend for high performance of engine oil, the durability against engine oil having a large amount of an amine type additive incorporated, has become an important subject.

Especially, a vulcanizate of a composition containing a copolymer having a content of polymer units based on VdF as high as at least 35 mol %, such as a hexafluoropropylene (hereinafter referred to as HFP)/VdF type elastic copolymer or a HFP/VdF/tetrafluoroethylene (hereinafter referred to as TFE)type elastic copolymer, has had a problem such that the degree of deterioration due to the reaction of the amine type additive to the sites of the polymer units based on VdF, is substantial.

Whereas, a vulcanizate of a composition containing a TFE/propylene (hereinafter referred to as P)/VdF type elastic copolymer as a copolymer having a low content (such as not higher than 15 mol %) of polymer units based on VdF, is excellent in engine oil resistance. JP-A-6-157858 discloses that by employing an organic quarternary ammonium bisulfate as a vulcanization accelerator, it is possible to obtain an excellent vulcanizate even with a TFE/P/VdF type elastic copolymer, which has a content of polymer units based on VdF as low as 4 mol %. However, as shown in its Examples, a TFE/P/VdF type elastic copolymer having a content of polymer units based on VdF at a level of not higher than 5 mol %, has a vulcanization rate decreased as compared with a TFE/P/VdF type elastic copolymer having such a content as high as at least 10 mol %. In fact, if a relatively large amount of an organic quarternary ammonium bisulfate is incorporated in order to increase the vulcanization rate, there has been an adverse effect to the heat resistance or oil resistance of the vulcanizate.

DISCLOSURE OF THE INVENTION

An object of the present invention is to provide a crosslinkable elastic copolymer composition which contains a TFE/P/VdF type elastic copolymer having a low content of polymer units based on VdF, which is excellent in polyol vulcanizability and which gives a vulcanizate excellent in heat resistance and oil resistance.

The present invention is firstly the following invention.

A crosslinkable elastic copolymer composition characterized in that it comprises:

(A) an elastic copolymer comprising from 35 to 65 mol % of polymer units based on TFE, from 20 to 50 mol % of polymer units based on P, and from 0.5 to 15 mol % of polymer units based on VdF, (B) at least one member selected from the group consisting of an organic quaternary ammonium hydroxide represented by the general formula $R^1R^2R^3R^4NOH$ (wherein $R^1$ to $R^4$ are the same or different $C_{1-20}$ hydrocarbon groups) or the following formula 1 (wherein $R^5$ is a hydrogen atom or a $C_{1-20}$ hydrocarbon group, and n is an integer of from 3 to 5), and a salt of an organic quaternary phosphonium compound with a nitrogen-containing heterocyclic compound:

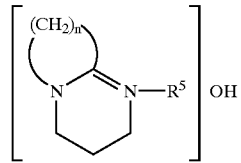

Formula 1

(C) at least one member selected from an organic polyhydroxy compound and its derivative, and (D) at least one member selected from a metal oxide and a metal hydroxide.

The present invention is secondly the following invention.

A crosslinkable elastic copolymer composition characterized in that it comprises:

(A) an elastic copolymer comprising from 35 to 65 mol % of polymer units based on TFE, from 20 to 50 mol % of polymer units based on P, and from 0.5 to 15 mol % of polymer units based on VdF, (B) at least one member selected from the group consisting of an organic quaternary ammonium hydroxide represented by the general formula $R^1R^2R^3R^4NOH$ (wherein $R^1$ to $R^4$ are the same or different $C_{1-20}$ hydrocarbon groups) or the following formula 1 (wherein $R^5$ is a hydrogen atom or a $C_{1-20}$ hydrocarbon group, and n is an integer of from 3 to 5), and a salt of an organic quaternary phosphonium compound with a nitrogen-containing heterocyclic compound:

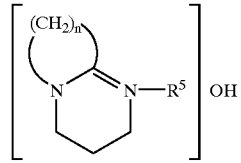

Formula 1

(C) at least one member selected from an organic polyhydroxy compound and its derivative, (D) at least one member selected from a metal oxide and a metal hydroxide, and (E) an amine compound excluding the compound represented by the formula 1.

BEST MODE FOR CARRYING OUT THE INVENTION

The Mooney viscosity $ML_{1+10}$ (121° C.) as an index of the molecular weight of the elastic copolymer of component (A) in the composition of the present invention, is not particularly limited, but it is preferably within a range of from 5 to 150, particularly preferably within a range of from 10 to 100, as a kneading operation is carried out usually at the time of the preparation of the composition.

Component (A) wherein the proportion of polymer units based on VdF is from 0.5 to 15 mol %, preferably from 0.5 to 10 mol %, is capable of giving a vulcanizate which is excellent in engine oil resistance. Component (A) wherein the proportion of polymer units based on TFE is from 35 to 65 mol %, preferably from 45 to 65 mol %, has excellent heat resistance and chemical resistance and component (A) wherein the proportion of polymer units based on propylene is from 20 to 50 mol %, preferably from 35 to 50 mol %, is capable of giving a vulcanizate having excellent oil resistance.

Component (A) may contain or may not contain unsaturated bonds as readily vulcanizable sites in the copolymer. By simply heat-treating component (A) or heat-treating it in the presence of a basic substance or an acidic substance, it is possible to remove HF from polymer units based on VdF and introduce carbon-carbon unsaturated bonds into the polymer units. Further, unsaturated bonds may likewise be introduced by treating a water dispersion of component (A) obtained by polymerization, with a basic substance such as potassium hydroxide. By introducing such unsaturated bonds, the vulcanizability of component (A) can be improved.

The amount of unsaturated bonds to be introduced is preferably from about 1 to 50 mol % of the polymer units based on VdF. If the amount is less than this range, the effect for improvement of the vulcanizability tends to be small, and if it exceeds this range, the properties of the resulting vulcanizate may sometimes deteriorate.

For the production of the elastic copolymer of component (A), various polymerization systems may be employed such as bulk polymerization, suspension polymerization, emulsion polymerization or solution polymerization, and it is possible to optionally adopt a catalyst polymerization method employing a radical polymerization initiator, an ionizing radiation polymerization method or a redox type polymerization method.

Component (B) functioning as a vulcanization accelerator is at least one member selected from the group consisting of an organic quaternary ammonium hydroxide represented by the general formula $R^1R^2R^3R^4NOH$ (wherein $R^1$ to $R^4$ are the same or different $C_{1-20}$ hydrocarbon groups) or the following formula 1 (wherein $R^5$ is a hydrogen atom or a $C_{1-20}$ hydrocarbon group, and n is an integer of from 3 to 5), and a salt of an organic quaternary phosphonium compound with a nitrogen-containing heterocyclic compound:

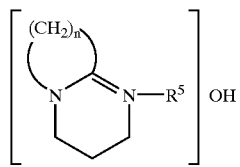

Formula 1

Component (B) has an activity substantially higher than the organic quaternary ammonium bisulfate, and when component (B) is employed, an excellent vulcanizate can be obtained even with a TFE/P/VdF type elastic copolymer having a low content of polymer units based on VdF.

The following compounds may be exemplified as component (B). These compounds may be used alone, respectively, or may be used in a combination of two or more of them.

The following may be exemplified as the organic quarternary ammonium hydroxide represented by the above general formula $R^1R^2R^3R^4NOH$ or the formula (1) as component (B).

Tetrabutylammonium hydroxide, tetramethylammonium hydroxide, tetraethylammonium hydroxide, trioctylmethylammonium hydroxide, tridecylmethylammonium hydroxide, benzyltrimethylammonium hydroxide, 8-benzyl-1,8-diazabicyclo[5.4.0]undeca-7-enium hydroxide, 1,8-diazabicyclo[5.4.0]undeca-7-enium hydroxide, 1,5-diazabicyclo[4.3.0]nona-5-enium hydroxide, etc.

Further, the flowing may be exemplified as the salt of an organic quarternary phosphonium compound with a nitrogen-containing heterocyclic compound, as component (B).

The salt of an organic quarternary phosphonium compound with a nitrogen-containing heterocyclic compound, of component (B), contains an organic quarternary phosphonium ion represented by the general formula $R^6R^7R^8R^9P^+$, wherein $R^6, R^7, R^8$ and $R^9$ may be the same or different and may, for example, be a $C_{1-20}$ hydrocarbon group, such as an alkyl group such as a methyl group, an ethyl group, a butyl group, an ethylhexyl group or a dodecyl group, a cycloalkyl group such as a cyclohexyl group, an aralkyl group such as a benzyl group or a methylbenzyl group, or a substituted or unsubstituted aryl group such as a phenyl group, a naphthyl group or a butylphenyl group, or a $C_{1-20}$ linear or branched halogenated hydrocarbon group such as a trifluoromethyl group or a trifluoroethyl group.

The nitrogen-containing heterocyclic compound in component (B) may, for example, be a pyrroline, a morpholine, pyrrolidine, a pyrrole, a pyrazole, a pyrazoline, an imidazole, an imidazoline, a benzotriazole, a benzoimidazole, an indoline, an indole, an isoindole, a purine or a carbazole. These nitrogen-containing heterocyclic compounds may have hydrocarbon groups, halogenated hydrocarbon groups, halogen atoms, hydroxyl groups or other substituents. A preferred nitrogen-containing heterocyclic compound is an imidazole, a benzoimidazole, a benzotriazole or a carbazole, which may have the above-mentioned substituents.

The following may preferably be mentioned as the salt of an organic quarternary phosphonium compound with a nitrogen-containing heterocyclic compound, of component (B).

A benzotriazolate, such as tetrabutylphosphonium benzotriazolate, tetraoctylphosphonium benzotriazolate, methyltrioctylphosphonium benzotriazolate, butyltrioctylphosphonium benzotriazolate, phenyltributylphosphonium benzotriazolate, benzyltributylphosphonium benzotriazolate, benzyltricyclohexylphosphonium benzotriazolate, benzyltrioctylphosphonium benzotriazolate, butyltriphenylphosphonium benzotriazolate, octyltriphenylphosphonium benzotriazolate, benzyltriphenylphosphonium benzotriazolate, tetraphenylphosphonium benzotriazolate, 2,2,2,-trifluoroethyltributylphosphonium benzotriazolate or 2,2,3,3-tetrafluoropropyltrioctylphosphonium benzotriazolate; a benzoimidazolate such as tetrabutylphosphonium benzoimidazolate; an imidazolate such as tetrabutylphosphonium imidazolate; a carbazolate such as tetrabutylphosphonium carbazolate.

Component (B) is used in an amount of from 0.1 to 10 parts by weight, preferably from 0.1 to 3 parts by weight, per 100 parts by weight of the elastic copolymer of component (A). If the amount is less than 0.1 part by weight, it tends to be difficult to obtain an adequate vulcanization density and vulcanization properties, and if it exceeds 10 parts by weight, a scorching phenomenon or the like is likely to occur and adversely affect the molding operation, or the chemical resistance, etc. of the vulcanizate tend to deteriorate. Usually, the organic quarternary ammonium hydroxide is commercially available in the form of an aqueous solution or an alcohol solution and will be used in that form.

As the organic polyhydroxy compound of component (C) which functions as a vulcanizing agent, an aromatic polyhydroxy compound having at least two phenolic hydroxyl groups, is preferred, as it has high vulcanization activities. A compound having an alcoholic hydroxyl group may be used, but a particularly preferred organic polyhydroxy compound is an aromatic dihydroxy compound having two phenolic hydroxyl groups. Specifically, the following may preferably be exemplified as the organic polyhydroxy compound.

2,2-bis(4-hydroxyphenyl)propane [abbreviated name: bisphenol A], 2,2-bis(4-hydroxyphenyl)perfluoropropane [abbreviated name: bisphenol AF], 1,3,5-trihydroxybenzene, 1,7-dihydroxynaphthalene, 2,7-dihydroxynaphthalene, 1,6-dihydroxynaphthalene, 4,4'-dihydroxybiphenyl, catechol, p,p'-dihydroxystilbene, 2,6-dihydroxyanthracene, hydroquinone, 2,2-bis(4-hydroxyphenyl)butane, 2,2-bis(4-hydroxyphenyl) tetrafluorodichloropropane, 4,4'-dihydroxydiphenylsulfone, 4,4'-dihydroxydiphenylketone, tris(4-hydroxyphenyl) methane, 2,2,3,3,4,4-hexafluoropentane-1,5-diol, ethylene glycol, polyethylene glycol, etc.

Further, as the derivative of an organic polyhydroxy compound of component (C) which functions as a vulcanizing agent, an alkali metal salt or an alkaline earth metal salt of an organic polyhydroxy compound, or a salt thereof with an organic quarternary ammonium hydroxide as component (B), may preferably be exemplified.

As component (C), such organic polyhydroxy compounds and their derivatives may be used alone, respectively, or in a combination of two or more of them. Usually, component (C) is used alone or as a mixture of two or more of them, and the amount is from 0.1 to 10 parts by weight, preferably from 0.5 to 5 parts by weight, per 100 parts by weight of the elastic copolymer of component (A). If it is too small, it tends to be difficult to obtain an adequate crosslinking density, and if it is too much, the effects do not change.

The metal oxide or the metal hydroxide of component (D) which functions as an acid-acceptor, may, for example, be an oxide of a bivalent metal such as magnesium, calcium, lead or zinc, a hydroxide of such a bivalent metal, or lithium hydroxide. The amount of component (D) is from 1 to 50 parts by weight, preferably from 2 to 30 parts by weight, per 100 parts by weight of the elastic copolymer of component (A). They may be used in a combination of two or more of them.

The amine compound of component (E) (excluding the compound represented by the above formula 1) to be used for improvement of the vulcanization rate, may, for example, be 1,8-diazabicyclo[5.4.0]undeca-7-ene, 1,5-diazabicyclo [4.3.0]nona-5-ene, 6-dibutylamino-1,8-diazabicyclo[5.4.0] undeca-7-ene, triethylamine or tributylamine. The amount of component (E) is preferably from 0.01 to 3 parts by weight, particularly preferably from 0.05 to 1 part by weight, per 100 parts by weight of the elastic copolymer of component (A). They may be used in a combination of two or more of them.

To the composition of the present invention, a reinforcing agent such as carbon black, fine silica, clay or talc, which is commonly used for the preparation of rubber, other fillers, pigments, antioxidants, stabilizers, processing aids or internal release agents, may, for example, be added or blended.

For the preparation of the composition of the present invention, it is advisable to adequately uniformly mix components (A), (B), (C), (D) and (E) and optionally other additives. Also, components (B) and (C) may be used as preliminarily mixed.

This mixing is carried out by means of a kneading roll, a kneader, a Banbury mixer, an extruder or the like, which has been commonly employed. The operation conditions for the mixing are not particularly limited. However, the additives can be dispersed in the elastic copolymer usually by kneading at a temperature of from about 30 to 130° C. for about 1 to 60 minutes. Such an additives may be dissolved and dispersed in a suitable solvent and mixed as a suspension solution.

Further, a so-called wet mixing may be adopted, whereby the mixing is carried out in a medium from the very beginning. In such a case, a composition in the form of a solution can be obtained by means of a mixing machine such as a roll, ball mill or homogenizer. Otherwise, by mixing component (B) to a water dispersion of component (A) obtainable by polymerization, component (B), etc., can be dispersed more effectively. Further, with respect to the processing conditions for the mixing, it is advisable to select the optimum conditions depending upon the purpose or the types of the blend and the starting materials used.

The composition of the present invention may be molded into a molded product such as a sheet, a pipe, a rod, a tube, an angle, a channel, a coated cloth or a coated plate, by a continuous molding method such as compression molding, injection molding, extrusion molding, transfer molding, roll coating, brush coating or impregnation. Further, it may be molded into unusual shapes or special shapes, such as spongy rubber, etc., by other various molding methods. The composition of the present invention thus molded, is vulcanized by a vulcanization operation as described hereinafter.

Thus, from the composition of the present invention, a rubber product which is a vulcanizate, will be obtained. In the present invention, as a procedure for vulcanization, a procedure which has been commonly used, may be employed. For example, it is possible to employ a procedure of heating while pressurizing in a mold, or a procedure of molding by e.g. extrusion, calendaring roll or injection molding, followed by heating in a heating oven or the like. With respect to the vulcanization conditions, it is advisable to select optimum conditions depending upon the blend, molding conditions, etc. The vulcanization temperature is usually from about 100 to 400° C., preferably from about 150 to 200° C. Further, the vulcanization time is within a range of from about 30 seconds to a few hours. Further, the obtained vulcanizate may be subjected to secondary vulcanization. By the secondary vulcanization, the physical properties may sometimes be improved. The conditions for the secondary vulcanization are not particularly limited and may be suitably selected depending upon the shape or size of the molded product, etc. They are from 150 to 250° C., preferably from 180° C. to 230° C., and from about 2 to 25 hours. With a TFE/P/VdF type elastic copolymer having a low content of polymer units based on VdF, polyol vulcanization will readily proceed by employing as a vulcanization accelerator an organic quarternary ammonium hydroxide or a salt of an organic quarternary phosphonium compound with a nitrogen-containing heterocyclic compound, of the above-mentioned component (B), or by a combined use thereof with an amine compound of the above-mentioned component (E). Further, the resulting vulcanizate will be excellent in heat resistance and oil resistance, since the content of polymer units based on VdF is low.

Now, the present invention will be described in further detail with reference to Examples and Comparative Examples. However, the present invention is by no means restricted by them.

Examples 1 to 6 represent Examples of the present invention, and Examples 7 to 10 represent Comparative Examples. Materials blended to have a composition as identified in Table 1 or 2 were uniformly mixed by a twin roll to obtain a crosslikable elastic copolymer composition. With respect to the vulcanization properties of this composition, the lowest torque ($M_L$) and the highest torque ($M_H$) at 170° C. for 24 minutes, and the time $t_c$ (90) until the torque value reached 90% of the highest torque value, were measured by means of an oscillating disk rheometer (manufactured by Toyo Seiki). Further, this composition was subjected to press vulcanization at 170° C. for 20 minutes, and then subjected to secondary vulcanization at 230° C. for 24 hours in an oven.

With respect to the obtained vulcanizate, in accordance with JIS K6301, the original physical properties, the heat resistance (at 230° C. for 70 hr) and the oil resistance (at 175° C. for 70 hr) were measured. For the measurement of the oil resistance, SH grade engine oil (Castle Motor Oil Clean SH, manufactured by Toyota Automobile) was employed. The results are shown in Tables 3 and 4. Symbol "*" in the Tables indicates that no vulcanized sheet was obtained.

Abbreviations, etc. in Tables 1 and 2 are shown in Table 5. Further, the respective elastic copolymers used, were prepared by emulsion polymerization, and their contents (mol %) of polymer units based on the respective monomers, and the Mooney viscosity $ML_{1+10}$ (121° C.) are also shown in Table 5. The compositions of polymer units based on the respective monomers of component (A) were obtained by $^{19}F$-NMR and $^{1}H$-NMR. Further, unsaturated bonds in the elastic copolymer 5 were confirmed to be present by the absorption at wave numbers of 3120 cm$^{-1}$ and 1722 cm$^{-1}$ by the infrared analysis.

TABLE 1

| Unit: Parts by weight | Ex. 1 | Ex. 2 | Ex. 3 | Ex. 4 | Ex. 5 | Ex. 6 |
|---|---|---|---|---|---|---|
| Elastic copolymer 1 | 100 | | | | | |
| Elastic copolymer 2 | | 100 | | | | |
| Elastic copolymer 3 | | | 100 | | 100 | |
| Elastic copolymer 4 | | | | 100 | | |
| Elastic copolymer 5 | | | | | | 100 |
| MT carbon black | 25 | 25 | 25 | 25 | 25 | 25 |
| Kyowa mag 150 | 3 | 3 | 3 | 3 | 3 | 3 |
| Calvit | 3 | 3 | 3 | 3 | 3 | 3 |
| Bisphenol AF | 1.5 | 1.5 | 1.5 | 1.5 | 1.5 | 1.5 |
| TBAOH | 0.5 | 0.5 | 0.9 | 1.2 | | 1 |
| BTMAOH | | | | | 1 | |

TABLE 2

| Unit: Parts by weight | Ex. 7 | Ex. 8 | Ex. 9 | Ex. 10 |
|---|---|---|---|---|
| Elastic copolymer 3 | 100 | 100 | | |
| Elastic copolymer 4 | | | 100 | 100 |
| MT carbon black | 25 | 25 | 25 | 25 |
| Kyowa mag 150 | 3 | 3 | 3 | 3 |
| Calvit | 3 | 3 | 3 | 3 |
| Bisphenol AF | 1.5 | 1.5 | 1.5 | 1.5 |
| TBAHS | 0.7 | 1.3 | 1.3 | |
| TOMAHS | | | | 2 |

TABLE 3

| | Ex. 1 | Ex. 2 | Ex. 3 | Ex. 4 | Ex. 5 | Ex. 6 |
|---|---|---|---|---|---|---|
| Vulcanization properties (170° C. × 24 min) | | | | | | |
| $M_L$ (kg · cm) | 7 | 7 | 8 | 7 | 8 | 7 |
| $M_n$ (kg · cm) | 45 | 45 | 46 | 39 | 44 | 48 |
| $t_c$ (90) (min) | 6.2 | 7.2 | 7.1 | 7.7 | 7.2 | 7.3 |
| Original physical properties | | | | | | |
| Hardness (JIS-A) | 72 | 72 | 73 | 73 | 73 | 73 |
| 100% Modulus (kg · f/cm$^2$) | 65 | 70 | 73 | 48 | 77 | 80 |
| Tensile strength (kg · f/cm$^2$) | 180 | 175 | 183 | 160 | 175 | 188 |
| Elongation (%) | 270 | 250 | 223 | 280 | 230 | 215 |
| Compression set (%, 200° C. × 70 hr) | 22 | 23 | 25 | 27 | 27 | 22 |
| Heat resistance (230° C. × 70 hr) | | | | | | |
| Hardness change (degree) | +2 | +1 | +2 | +1 | +1 | +1 |
| Tensile strength change (%) | +4 | +7 | +3 | +11 | +2 | +5 |
| Elongation change (%) | −11 | −8 | −6 | −10 | −9 | −8 |
| Oil resistance (175° C. × 70 hr) | | | | | | |
| Hardness change (degree) | −2 | −1 | −1 | 0 | −1 | −1 |
| Tensile strength change (%) | −10 | −8 | −2 | −5 | −5 | −3 |
| Elongation change (%) | −12 | −8 | −3 | +5 | +2 | 0 |
| Volume change (%) | +3 | +3 | +5 | +6 | +5 | +5 |

TABLE 4

| | Ex. 7 | Ex. 8 | Ex. 9 | Ex. 10 |
|---|---|---|---|---|
| Vulcanization properties (170° C. × 24 min) | | | | |
| $M_L$ (kg · cm) | 5 | 7 | 7 | 5 |
| $M_n$ (kg · cm) | 35 | 40 | 12 | 18 |
| $t_C$ (90) (min) | 15.8 | 7.7 | 22.5 | 21.5 |
| Original physical properties | | | | |
| Hardness (JIS-A) | 75 | 77 | * | 68 |
| 100% Modulus (kg · f/cm$^2$) | 48 | 68 | | 35 |
| Tensile strength (kg · f/cm$^2$) | 161 | 173 | | 121 |
| Elongation (%) | 230 | 210 | | 380 |
| Compression set (%, 200° C. × 70 hr) | 24 | 28 | | 55 |
| Heat resistance (230 ° C. × 70 hr) | | | | |
| Hardness change (degree) | +4 | +6 | | +7 |
| Tensile strength change (%) | +18 | +10 | | +40 |
| Elongation change (%) | −15 | −28 | | −42 |
| Oil resistance (175° C. × 70 hr) | | | | |
| Hardness change (degree) | 0 | +3 | | +6 |
| Tensile strength change (%) | +5 | +15 | | +37 |

TABLE 4-continued

|  | Ex. 7 | Ex. 8 | Ex. 9 | Ex. 10 |
|---|---|---|---|---|
| Elongation change (%) | −8 | −20 |  | −46 |
| Volume change (%) | +6 | +6 |  | +8 |

TABLE 5

| Elastic copolymer 1 | VdF/TFE/P = 15/50/35, (ML$_{1+10}$ = 60) |
|---|---|
| Elastic copolymer 2 | VdF/TFE/P = 10/55/35, (ML$_{1+10}$ = 52) |
| Elastic copolymer 3 | VdF/TFE/P = 4/52/44, (ML$_{1+10}$ = 44) |
| Elastic copolymer 4 | VdF/TFE/P = 1/54/45, (ML$_{1+10}$ = 35) |
| Elastic copolymer 5 | Copolymer having unsaturated bonds introduced into Elastic copolymer 4 (ML$_{1+10}$ = 35) |
| Kyowa mag 150 | Magnesium oxide (manufactured by Kyowa Chemical Industry) |
| Calvit | Calcium hydroxide (manufactured by Ohmi Chemical) |
| TBAOH | Tetrabutylammonium hydroxide (used as a methanol solution having a 40% concentration.) The amounts by parts in Tables are calculated as solid content of tetrabutylammonium hydroxide. |
| BTMAOH | Benzyltrimethylammonium hydroxide (used as a methanol solution having a 40% concentration.) The amounts by parts in Tables are calculated as solid content of benzyltrimethylammonium hydroxide |
| TBAHS | Tetrabutylammonium bisulfate |
| TOMAHS | Trioctylmethylammonium bisulfate |

Examples 11 to 17 represent Examples of the present invention, and Examples 18 to 21 represent Comparative Examples. Materials blended to have a composition (parts by weight) shown in Table 6 or 7 were uniformly mixed by a twin roll to obtain a crosslikable elastic copolymer composition. With respect to this composition, the vulcanization properties i.e. the lowest torque ($M_L$) and the highest torque ($M_H$) at 170° C. for 24 minutes, and the time $t_c$ (90) until the torque value reached 90% of the highest torque value, were measured by means of an oscillating disk rheometer (manufactured by Toyo Seiki). Further, this composition was subjected to press vulcanization at 170° C. for 20 minutes, and then subjected to secondary vulcanization at 230° C. for 24 hours in an oven. In Example 20, no vulcanized sheet was obtained even if press vulcanization was carried out at 170° C. for 20 minutes.

With respect to the obtained vulcanizate, in accordance with JIS K6301, the original physical properties, the compression set (200° C., 70 hr), the heat resistance (230° C., 70 hr) and the oil resistance (the sample was immersed in an oil at 175° C. for 70 hours) were measured. For the measurement of the oil resistance, SH grade engine oil (Castle Motor Oil Clean SH, manufactured by Toyota Automobile) was used. The results are shown in Tables 8 and 9.

Abbreviations, etc. in Tables 6 and 7 are shown in Table 10. Further, the respective elastic copolymers used were prepared by emulsion polymerization, and their contents (molar ratio) of polymer units based on the respective monomers, and the Mooney viscosity ML$_{1+10}$ (121° C.) are shown in Table 10. The compositions of polymer units based on the respective monomers of component (A) were obtained by $^{19}$F-NMR and $^1$H-NMR. Unsaturated bonds in the elastic copolymer (e) obtained by heat treating the elastic copolymer (d) at 290° C. for one hour, were confirmed to be present by the absorption at wave numbers of 3120 cm$^{-1}$ and 1722 cm$^{-1}$ by the infrared analysis.

TABLE 6

| Unit: Parts by weight | Ex. 11 | Ex. 12 | Ex. 13 | Ex. 14 | Ex. 15 | Ex. 16 |
|---|---|---|---|---|---|---|
| Elastic copolymer (a) | 100 |  |  |  |  |  |
| Elastic copolymer (b) |  | 100 |  |  |  |  |
| Elastic copolymer (c) |  |  | 100 |  | 100 |  |
| Elastic copolymer (d) |  |  |  | 100 |  |  |
| Elastic copolymer (e) |  |  |  |  |  | 100 |
| MT carbon black | 25 | 25 | 25 | 25 | 25 | 25 |
| Kyowa mag 150 | 3 | 3 | 3 | 3 | 3 | 3 |
| Calvit | 3 | 3 | 3 | 3 | 3 | 3 |
| Bisphenol AF | 1.5 | 1.5 | 1.5 | 1.5 | 1.5 | 1.5 |
| TBAOH | 0.5 | 0.5 | 0.9 | 1.2 | 1 |  |
| BTMAOH |  |  |  |  | 1 |  |
| DBU | 0.1 | 0.1 | 0.1 | 0.1 | 0.1 | 0.1 |

TABLE 7

| Unit: Parts by weight | Ex. 17 | Ex. 18 | Ex. 19 | Ex. 20 | Ex. 21 |
|---|---|---|---|---|---|
| Elastic copolymer (c) | 100 | 100 | 100 |  |  |
| Elastic copolymer (d) |  |  |  | 100 | 100 |
| MT carbon black | 25 | 25 | 25 | 25 | 25 |
| Kyowa mag 150 | 3 | 3 | 3 | 3 | 3 |
| Calvit | 3 | 3 | 3 | 3 | 3 |
| Bisphenol AF | 1.5 | 1.5 | 1.5 | 1.5 | 1.5 |
| TBAHS | 0.9 |  |  |  |  |
| TOMAHS |  | 0.7 | 1.3 | 1.3 |  |
| Trioctylmethyl ammonium bisulfate | 0.3 |  |  |  |  |
| DBU | 0.3 |  |  |  |  |

TABLE 8

|  | Ex. 11 | Ex. 12 | Ex. 13 | Ex. 14 | Ex. 15 | Ex. 16 |
|---|---|---|---|---|---|---|
| Vulcanization properties (170° C. × 24 min) |  |  |  |  |  |  |
| $M_L$ (kg · cm) | 7 | 7 | 8 | 8 | 9 | 8 |
| $M_H$ (kg · cm) | 46 | 47 | 48 | 42 | 46 | 48 |
| $t_c$ (90) (min) | 5.0 | 6.1 | 5.9 | 6.4 | 6.1 | 6.0 |
| Original physical properties |  |  |  |  |  |  |
| Hardness (JIS-A) | 73 | 73 | 74 | 74 | 74 | 73 |
| 100% Modulus (kg · f/cm$^2$) | 70 | 76 | 80 | 59 | 85 | 82 |
| Tensile strength (kg · f/cm$^2$) | 185 | 180 | 185 | 175 | 175 | 180 |
| Elongation (%) | 250 | 230 | 210 | 265 | 220 | 210 |
| Compression set (%, 200° C. × 70 hr) | 24 | 25 | 26 | 25 | 25 | 24 |
| Heat resistance (230° C. × 70 hr) |  |  |  |  |  |  |
| Hardness change (degree) | +3 | +2 | +2 | +2 | +1 | +1 |
| Tensile strength change (%) | +2 | +7 | +5 | +10 | +8 | +7 |
| Elongation change (%) | −14 | −10 | −8 | −12 | −7 | −5 |
| Oil resistance (175° C. × 70 hr) |  |  |  |  |  |  |
| Hardness change (degree) | −3 | −2 | −3 | −2 | −3 | −2 |
| Tensile strength change (%) | −10 | −11 | −8 | −5 | −4 | −9 |
| Elongation change (%) | −15 | −10 | +2 | −10 | +5 | +1 |
| Volume change (%) | +3 | +3 | +6 | +5 | +6 | +5 |

TABLE 9

|  | Ex. 17 | Ex. 18 | Ex. 19 | Ex. 20 | Ex. 21 |
|---|---|---|---|---|---|
| Vulcanization properties (170° C. × 24 min) | | | | | |
| $M_L$ (kg · cm) | 9 | 5 | 7 | 7 | 5 |
| $M_H$ (kg · cm) | 50 | 35 | 40 | 12 | 18 |
| $t_{c\ (90)\ (min)}$ | 5.1 | 15.8 | 7.7 | 22.5 | 21.5 |
| Original physical properties | | | | | |
| Hardness (JIS-A) | 76 | 75 | 77 | | 68 |
| 100% Modulus (kg · f/cm²) | 90 | 48 | 68 | | 35 |
| Tensile strength (kg · f/cm²) | 195 | 161 | 173 | | 121 |
| Elongation (%) | 195 | 230 | 210 | | 380 |
| Compression set (%, 200° C. × 70 hr) | 23 | 24 | 28 | | 55 |
| Heat resistance (230° C. × 70 hr) | | | | | |
| Hardness change (degree) | +2 | +4 | +6 | | +7 |
| Tensile strength change (%) | +2 | +18 | +10 | | +40 |
| Elongation change (%) | −14 | −15 | −28 | | −42 |
| Oil resistance (175° C. × 70 hr) | | | | | |
| Hardness change (degree) | −4 | 0 | +3 | | +6 |
| Tensile strength change (%) | −10 | +5 | +15 | | +37 |
| Elongation change (%) | −3 | −8 | −20 | | −46 |
| Volume change (%) | +6 | +6 | +6 | | +8 |

TABLE 10

| | |
|---|---|
| Elastic copolymer (a) | VdF/TFE/P = 15/50/35, ($ML_{1+10}$ = 60) |
| Elastic copolymer (b) | VdF/TFE/P = 10/55/35, ($ML_{1+10}$ = 52) |
| Elastic copolymer (c) | VdF/TFE/P = 4/52/44, ($ML_{1+10}$ = 44) |
| Elastic copolymer (d) | VdF/TFE/P = 1/54/45, ($ML_{1+10}$ = 35) |
| Elastic copolymer (e) | Elastic copolymer (d) obtained by heat treating the at 290° C. for one hour ($ML_{1+10}$ = 30) |
| Kyowa mag 150 | Magnesium oxide (manufactured by Kyowa Chemical Industry) |
| Calvit | Calcium hydroxide (manufactured by Ohmi Chemical) |
| TBAOH | Tetrabutylammonium hydroxide (used as a methanol solution having a 40% concentration.) The amounts by parts in Tables are calculated as solid content of tetrabutylammonium hydroxide. |
| BTMAOH | Benzyltrimethylammonium hydroxide (used as a methanol solution having a 40% concentration.) The amounts by parts in Tables are calculated as solid content of benzyltrimethylammonium hydroxide. |
| TBAHS | Tetrabutylammonium bisulfate |
| TOMAHS | 1,8-diazabicyclo[5.4.0]undeca-7-ene |

Examples 22 to 28 represent Examples of the present invention, and Examples 29 to 32 represent Comparative Examples. Materials blended to have a composition (unit: parts by weight) shown in Table 11 or 12 were uniformly mixed by a twin roll to obtain a crosslikable elastic copolymer composition. With respect to the vulcanization properties of this composition, the lowest torque ($M_L$) and the highest torque ($M_H$) at 170° C. for 24 minutes, and the time $t_c$ (90) until the torque value reached 90% of the highest torque value, were measured by means of an oscillating disk rheometer (manufactured by Toyo Seiki). Further, this composition was subjected to press vulcanization at 170° C. for 20 minutes, and then subjected to secondary vulcanization by heat treatment at 230° C. for 24 hours in an oven.

With respect to the obtained vulcanizate, in accordance with JIS K6301, the original physical properties, the heat resistance (at 230° C. for 70 hr), the oil resistance (at 175° C. for 70 hr) were measured. For the measurement of the oil resistance, SH grade engine oil (Castle Motor Oil Clean SH, manufactured by Toyota Automobile) was employed. The results are shown in Tables 13 and 14. Symbol "*" in the Tables represents that no vulcanized sheet was obtained.

Abbreviations, etc. in Tables 11 and 12 are shown in Table 15. Further, the respective elastic copolymers used were prepared by emulsion polymerization, and their contents (mol %) of polymer units based on the respective monomers, and the Mooney viscosity $ML_{1+10}$ (121° C.) are also shown in Table 15. The compositions of polymer units based on the respective monomers of component (A) were obtained by $^{19}$F-NMR and $^1$H-NMR. Further, unsaturated bonds in the elastic copolymer (j) were confirmed to be present by the absorption at wave numbers of 3120 cm$^{-1}$ and 1722 cm$^{-1}$ by the infrared analysis.

TABLE 11

| Unit: Parts by weight | Ex. 22 | Ex. 23 | Ex. 24 | Ex. 25 | Ex. 26 | Ex. 27 | Ex. 28 |
|---|---|---|---|---|---|---|---|
| Elastic copolymer (f) | 100 | | | | | | |
| Elastic copolymer (g) | | 100 | | | | | |
| Elastic copolymer (h) | | | 100 | | 100 | 100 | |
| Elastic copolymer (i) | | | | 100 | | | |
| Elastic copolymer (j) | | | | | | | 100 |
| MT carbon black | 25 | 25 | 25 | 25 | 25 | 25 | 25 |
| Kyowa mag 150 | 3 | 3 | 3 | 3 | 3 | 3 | 3 |
| Calvit | 6 | 6 | 6 | 6 | 6 | 6 | 6 |
| Bisphenol AF | 1.5 | 1.5 | 1.5 | 1.5 | 1.5 | 1.5 | 1.5 |
| TBPBT | 0.4 | 0.3 | 0.6 | 1.2 | | | 1 |
| TBPBI | | | | | 0.6 | | |
| TBPI | | | | | | 0.6 | |

TABLE 12

| Unit: Parts by weight | Ex. 29 | Ex. 30 | Ex. 31 | Ex. 32 |
|---|---|---|---|---|
| Elastic copolymer (i) | 100 | 100 | | |
| Elastic copolymer (j) | | | 100 | 100 |
| MT carbon black | 25 | 25 | 25 | 25 |
| Kyowa mag 150 | 3 | 3 | 3 | 3 |
| Calvit | 3 | 3 | 3 | 3 |
| Bisphenol AF | 1.5 | 1.5 | 1.5 | 1.5 |
| TBAHS | 0.7 | 1.3 | 1.3 | |
| TOMAHS | | | | 2 |

TABLE 13

| | Ex. 22 | Ex. 23 | Ex. 24 | Ex. 25 | Ex. 26 | Ex. 27 | Ex. 28 |
|---|---|---|---|---|---|---|---|
| Vulcanization properties (170° C. × 24 min) | | | | | | | |
| $M_L$ (kg · cm) | 7 | 7 | 8 | 7 | 7 | 8 | 8 |
| $M_H$ (kg · cm) | 45 | 45 | 47 | 43 | 43 | 45 | 45 |
| $t_c$ (90) (min) | 6.3 | 6.8 | 7.1 | 7.4 | 6.2 | 7.2 | 6.3 |

TABLE 13-continued

|  | Ex. 22 | Ex. 23 | Ex. 24 | Ex. 25 | Ex. 26 | Ex. 27 | Ex. 28 |
|---|---|---|---|---|---|---|---|
| Original physical properties | | | | | | | |
| Hardness (JIS-A) | 71 | 72 | 71 | 69 | 73 | 72 | 71 |
| 100% Modulus (kg · f/cm$^2$) | 52 | 65 | 61 | 47 | 77 | 65 | 53 |
| Tensile strength (kg · f/cm$^2$) | 184 | 182 | 196 | 175 | 170 | 185 | 185 |
| Elongation (%) | 257 | 223 | 239 | 250 | 245 | 220 | 210 |
| Compression set (%, 200° C. × 70 hr) | 24 | 24 | 25 | 29 | 27 | 26 | 25 |
| Heat resistance (230° C. × 70 hr) | | | | | | | |
| Hardness change (degree) | +2 | +1 | +2 | +2 | +1 | +2 | +2 |
| Tensile strength change (%) | −5 | −6 | −5 | −7 | −5 | −8 | −9 |
| Elongation Change (%) | −12 | −8 | −9 | −12 | −10 | −13 | −14 |
| Oil resistance (175° C. × 70 hr) | | | | | | | |
| Hardness change (degree) | −3 | −4 | −3 | −2 | −2 | −2 | −3 |
| Tensile strength change (%) | −11 | −9 | −14 | −8 | −9 | −10 | −15 |
| Elongation Change (%) | −14 | −11 | −12 | −15 | −18 | −17 | −10 |
| Volume change (%) | +3 | +4 | +6 | +6 | +6 | +6 | +6 |

TABLE 14

|  | Ex. 29 | Ex. 30 | Ex. 31 | Ex. 32 |
|---|---|---|---|---|
| Vulcanization properties (170° C. × 24 min) | | | | |
| $M_L$ (kg · cm) | 5 | 7 | 7 | 5 |
| $M_H$ (kg · cm) | 35 | 40 | 12 | 18 |
| $t_c$ (90) (min) | 15.8 | 7.7 | 22.5 | 21.5 |
| Original physical properties | | | | |
| Hardness (JIS-A) | 75 | 77 | * | 68 |
| 100% Modulus (kg · f/cm$^2$) | 48 | 68 | | 35 |
| Tensile strength (kg · f/cm$^2$) | 161 | 173 | | 121 |
| Elongation (%) | 230 | 210 | | 380 |
| Compression set (%, 200° C. × 70 hr) | 24 | 28 | | 55 |
| Heat resistance (230° C. × 70 hr) | | | | |
| Hardness change (degree) | +4 | +6 | | +7 |
| Tensile strength change (%) | +18 | +10 | | +40 |
| Elongation change (%) | −15 | −28 | | −42 |
| Oil resistance (175° C. × 70 hr) | | | | |
| Hardness change (degree) | 0 | +3 | | +6 |
| Tensile strength change (%) | +5 | +15 | | +37 |
| Elongation change (%) | −8 | −20 | | −46 |
| Volume change (%) | +6 | +6 | | +8 |

TABLE 15

| Elastic copolymer (f) | VdF/TFE/P = 15/50/351 (ML$_{1+10}$ = 60) |
|---|---|
| Elastic copolymer (g) | VdF/TFE/P = 10/55/351 (ML$_{1+10}$ = 52) |
| Elastic copolymer (h) | VdF/TFE/P = 4/52/44, (ML$_{1+10}$ = 44) |
| Elastic copolymer (i) | VdF/TFE/P = 1/54/451 (ML$_{1+10}$ = 35) |
| Elastic copolymer (j) | Copolymer having unsaturated bonds introduced into Elastic copolymer (i) (ML$_{1+10}$ = 40) |
| Kyowa mag 150 | Magnesium oxide (manufactured by Kyowa Chemical Industry) |
| Calvit | Calcium hydroxide (manufactured by Ohmi Chemical) |
| TBPBT | Tetrabutylphosphonium benzotriazolate (used as a 50% aqueous solution) The amounts by parts in Tables are calculated as solid content of tetrabutylphosphonium benzotriazolate |
| TBPBI | Tetrabutylphosphonium benzoimidazolate (used as a 50% aqueous solution) The amounts by parts in Tables are calculated as solid content of tetrabutylphosphonium benzoimidazolate. |
| TBPI | Tetrabutylphosphonium benzoimidazolate (used as a 50% methanol solution) The amounts by parts in Tables are calculated as solid content of tetrabutylphosphonium benzoimidazolate |
| TOMAHS | Trioctylmethylammonium bisulfate |
| TBAHS | Tetrabutylammonium bisulfate |

The composition containing a TFE/P/VdF type elastic copolymer having a low content of polymer units based on VdF exhibits excellent polyol vulcanizability and gives a vulcanizate excellent in heat resistance and oil resistance. Further, the vulcanizate has various excellent physical properties of vulcanizate and is very useful for a wide range of applications including O-rings, gaskets, sealing materials, diaphragms, tubes, hoses, etc. for radiators and engines of automobiles, and similar parts for e.g. food plants, chemical plants, etc.

What is claimed is:

1. A composition, comprising:

(A) an elastic copolymer comprising from 35 to 65 mol %, of polymer units based on tetrafluoroethylene, from 20 to 50 mol % of polymer units based on propylene, and from 0.5 to 15 mol % of polymer units based on vinylidene fluoride;

(B) one member selected from the group consisting of
(i) an organic quaternary ammonium hydroxide represented by the general formula $R^1R^2R^3R^4NOH$ wherein
$R^1$ to $R^4$ are the same or different $C_{1-20}$ hydrocarbon groups,
(ii) an organic quaternary ammonium hydroxide represented by formula 1:

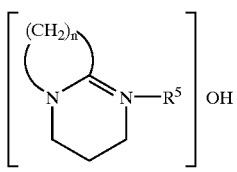

Formula 1 wherein
R$^5$ is a hydrogen atom or a C$_{1-20}$ hydrocarbon group and n is an integer of from 3 to 5, and
(iii) a salt of an organic quaternary phosphonium compound with a nitrogen-containing heterocyclic compound;
(C) at least one member selected from the group consisting of an organic polyhydroxy compound and its derivative; and
(D) at least one member selected from the group consisting of metal oxide and a metal hydroxide.

2. The composition according to claim 1, further comprising an amine compound excluding the compound represented by the formula 1.

3. The composition according to claim 1, further comprising a tertiary amine excluding the compound represented by the formula 1.

4. The composition according to claim 1, further comprising one member selected from the group consisting of 1,8-diazabicyclo[5.4.0]undeca-7-ene, 1,5-diazabicyclo[4.3.0]nona-5-ene, 6-dibutylamino-1,8-diazabicyclo[5.4.0]undeca-7-ene, triethylamine, and tributylamine.

5. A composition, comprising:
(A) an elastic copolymer comprising from 35 to 65 mol %, of polymer units based on tetrafluoroethylene, from 20 to 50 mol % of polymer units based on propylene, and from 0.5 to 15 mol % of polymer units based on vinylidene fluoride;
(B) one member selected from the group consisting of
(i) an organic quaternary ammonium hydroxide represented by the general formula

R$^1$R$^2$R$^3$R$^4$NOH wherein
R$^1$ to R$^4$ are the same or different C$_{1-20}$ hydrocarbon groups,
(ii) an organic quaternary ammonium hydroxide represented by formula 1:

Formula 1

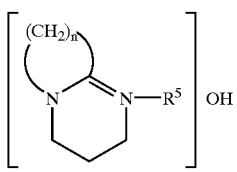

wherein
R$^5$ is a hydrogen atom or a C$_{1-20}$ hydrocarbon group and n is an integer of from 3 to 5, and
(iii) a salt of an organic quaternary phosphonium compound with a nitrogen-containing heterocyclic compound;
(C) at least one member selected from the group consisting of an organic polyhydroxy compound and its derivative;

(D) at least one member selected from the group consisting of metal oxide and a metal hydroxide; and
(E) an amine compound excluding the compound represented by the formula 1.

6. The composition according to claim 5, wherein component (E) is a tertiary amine excluding the compound represented by the formula 1.

7. The composition according to claim 5, wherein component (E) is one member selected from the group consisting of 1,8-diazabicyclo[5.4.0]undeca-7-ene, 1,5-diazabicyclo[4.3.0]nona-5-ene, 6-dibutylamino-1,8-diazabicyclo[5.4.0]undeca-7-ene, triethylamine, and tributylamine.

8. A composition, comprising:
(A) an elastic copolymer comprising from 35 to 65 mol %, of polymer units based on tetrafluoroethylene, from 20 to 50 mol % of polymer units based on propylene, and from 0.5 to 15 mol % of polymer units based on vinylidene fluoride;
(B) one member selected from the group consisting of
(i) an organic quaternary ammonium hydroxide represented by the general formula

R$^1$R$^2$R$^3$R$^4$NOH wherein
R$^1$ to R$^4$ are the same or different C$_{1-20}$ hydrocarbon groups,
(ii) an organic quaternary ammonium hydroxide represented by formula 1:

Formula 1

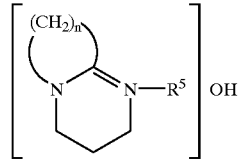

wherein
R$^5$ is a hydrogen atom or a C$_{1-20}$ hydrocarbon group and n is an integer of from 3 to 5, and
(iii) a salt of an organic quaternary phosphonium compound with a nitrogen-containing heterocyclic compound;
(C) at least one member selected from the group consisting of an organic polyhydroxy compound and its derivative;
(D) at least one member selected from the group consisting of metal oxide and a metal hydroxide; and
(E) one member selected from the group consisting of 1,8-diazabicyclo[5.4.0]undeca-7-ene, 1,5-diazabicyclo[4.3.0]nona-5-ene, 6-dibutylamino-1,8-diazabicyclo[5.4.0]undeca-7-ene, triethylamine, and tributylamine.

9. A composition, comprising:
(A) an elastic copolymer comprising from 35 to 65 mol %, of polymer units based on tetrafluoroethylene, from 20 to 50 mol % of polymer units based on propylene, and less than 10.0 mol % of polymer units based on vinylidene fluoride;
(B) at least one member selected from the group consisting of
(i) an organic quaternary ammonium hydroxide represented by the general formula

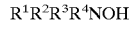
R$^1$R$^2$R$^3$R$^4$NOH wherein
R¹ to R⁴ are the same or different $C_{1-20}$ hydrocarbon groups,
(ii) an organic quaternary ammonium hydroxide represented by formula 1:

Formula 1

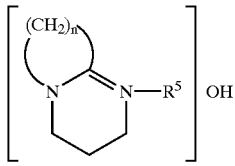

wherein
R⁵ is a hydrogen atom or a $C_{1-20}$ hydrocarbon group and n is an integer of from 3 to 5, and
(iii) a salt of an organic quaternary phosphonium compound with a nitrogen-containing heterocyclic compound;

(C) at least one member selected from the group consisting of an organic polyhydroxy compound and its derivative; and (D) at least one member selected from the group consisting of a metal oxide and a metal hydroxide.

10. The composition according to claim 9, further comprising an amine compound excluding the compound represented by the formula 1.

11. The composition according to claim 9, further comprising a tertiary amine excluding the compound represented by the formula 1.

12. The composition according to claim 9, further comprising one member selected from the group consisting of 1,8-diazabicyclo[5.4.0]undeca-7-ene, 1,5-diazabicyclo[4.3.0]nona-5-ene, 6-dibutylamino-1,8-diazabicyclo[5.4.0]undeca-7-ene, triethylamine, and tributylamine.

* * * * *